United States Patent [19]

Nakajima

[11] Patent Number: 5,633,744
[45] Date of Patent: May 27, 1997

[54] SUPPORTING APPARATUS FOR OPTICAL SCANNING APPARATUS

[75] Inventor: Tomohiro Nakajima, Machida, Japan

[73] Assignee: Ricoh Company, Ltd., Tokyo, Japan

[21] Appl. No.: 573,567

[22] Filed: Dec. 15, 1995

[30] Foreign Application Priority Data

Dec. 19, 1994 [JP] Japan .................................. 6-314375

[51] Int. Cl.$^6$ .................................................. G02B 26/08
[52] U.S. Cl. ..................... 359/196; 359/212; 359/216; 359/822; 250/234
[58] Field of Search ........................ 359/196–226, 359/811, 819, 822; 250/234–236; 347/250, 258–261; 358/474, 296, 302; 248/466, 477–480; 264/170; 355/232, 133

[56] References Cited

U.S. PATENT DOCUMENTS

| | | |
|---|---|---|
| 4,869,582 | 9/1989 | Nakajima et al. |
| 5,018,806 | 5/1991 | Nakajima. |
| 5,063,409 | 11/1991 | Nakajima. |
| 5,081,544 | 1/1992 | Kikuchi et al. ............... 359/212 |
| 5,132,833 | 7/1992 | Diau .......................... 359/212 |
| 5,283,681 | 2/1994 | Hoshino et al. ............. 359/212 |

*Primary Examiner*—James Phan
*Attorney, Agent, or Firm*—Oblon, Spivak, McClelland, Maier & Neustadt, P.C.

[57] ABSTRACT

A supporting apparatus for an optical scanning apparatus includes an optical source which emits an optical beam. A deflector deflects the optical beam from the optical source. A focusing lens focuses the optical beam from the deflector. An optical housing is provided with the optical source, deflector and the focusing lens. A positioning device supports the optical housing and positions the optical housing, relative to a frame. An adjusting device moves an end of the optical housing in a sub-scanning direction so that an inclination of the optical housing in the sub-scanning direction can be adjusted.

8 Claims, 6 Drawing Sheets

SUPPORTING APPARATUS FOR OPTICAL SCANNING APPARATUS

BACKGROUND OF THE INVENTION

1. Field of the Invention

The present invention relates to a supporting apparatus for an optical scanning apparatus which may be utilized in a laser printer, a digital copying machine, a laser facsimile machine, etc., and more particularly to a supporting apparatus for plural optical scanning apparatus.

2. Discussion of the Background

One of a conventional optical scanning apparatus includes an optical housing in which a laser source, a deflector having a polygon mirror, and a focusing system are installed. In the optical scanning apparatus, a laser beam emitted from the laser optical source is deflected by the polygon mirror and is focused on, for example, a scanning surface of a photoconductive element by a focus lens of the focusing system. Such an optical housing for an optical scanning apparatus includes a mounting reference surface for a polygon motor which is one element of a deflecting device and for an optical system. The polygon mirror and the optical system are often mounted on the reference surface in a vertical direction. Further, there is a conventional image forming apparatus which is composed of plural optical scanning apparatus, such as a color image forming apparatus. In the color image forming apparatus, the plural optical housings are installed as a frame structure.

In order to compensate for an inclination error in a sub-scanning direction, a relation between the scanning surface and each optical scanning apparatus needs to be adjusted accurately. However an adjustment work is difficult because of a rigidity of the optical housing, the frame, etc., and because an adjustment structure is large. Especially, when the plural optical scanning apparatus are installed and plural image forming stations are required in order to form the color image, the adjustment structure is much larger.

Therefore, as described in Japanese Laid Open Patent Nos. 4-131872 or 4-131876, it is proposed that an error of an image with respect to a reference image forming station is compensated for by a method that an angle of a mirror for returning a laser beam is changed by actuators. However, as plural actuators are needed in order to change the mirror in the apparatus, the structure is complicated and the assembly time increases.

SUMMARY AND OBJECT OF THE INVENTION

Accordingly, one object of the present invention is to provide a novel supporting apparatus for an optical scanning apparatus which has fewer positioning elements and an easier adjustment structure in order to compensate an inclination error in a sub-scanning direction, and thereby less assembly time and less adjustment time are achieved.

Another object of the present invention is to provide a novel supporting apparatus for plural optical scanning apparatus which has the above structure.

These and other objects and advantages are achieved by the present invention which provides a supporting apparatus for an optical scanning apparatus.

More specifically, the supporting apparatus of the present invention includes an optical source which emits an optical beam. A deflector deflects the optical beam from the optical source. A focussing lens focuses the optical beam from the deflector. Further, an optical housing is provided with the optical source, deflector and the focussing lens. A positioning device supports the optical housing and positions the optical housing to a frame. An adjusting device moves an end of the optical housing in a sub-scanning direction so that an inclination of the optical housing in the sub-scanning direction can be adjusted.

BRIEF DESCRIPTION OF THE DRAWINGS

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENT

In describing the preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

Figure 2:
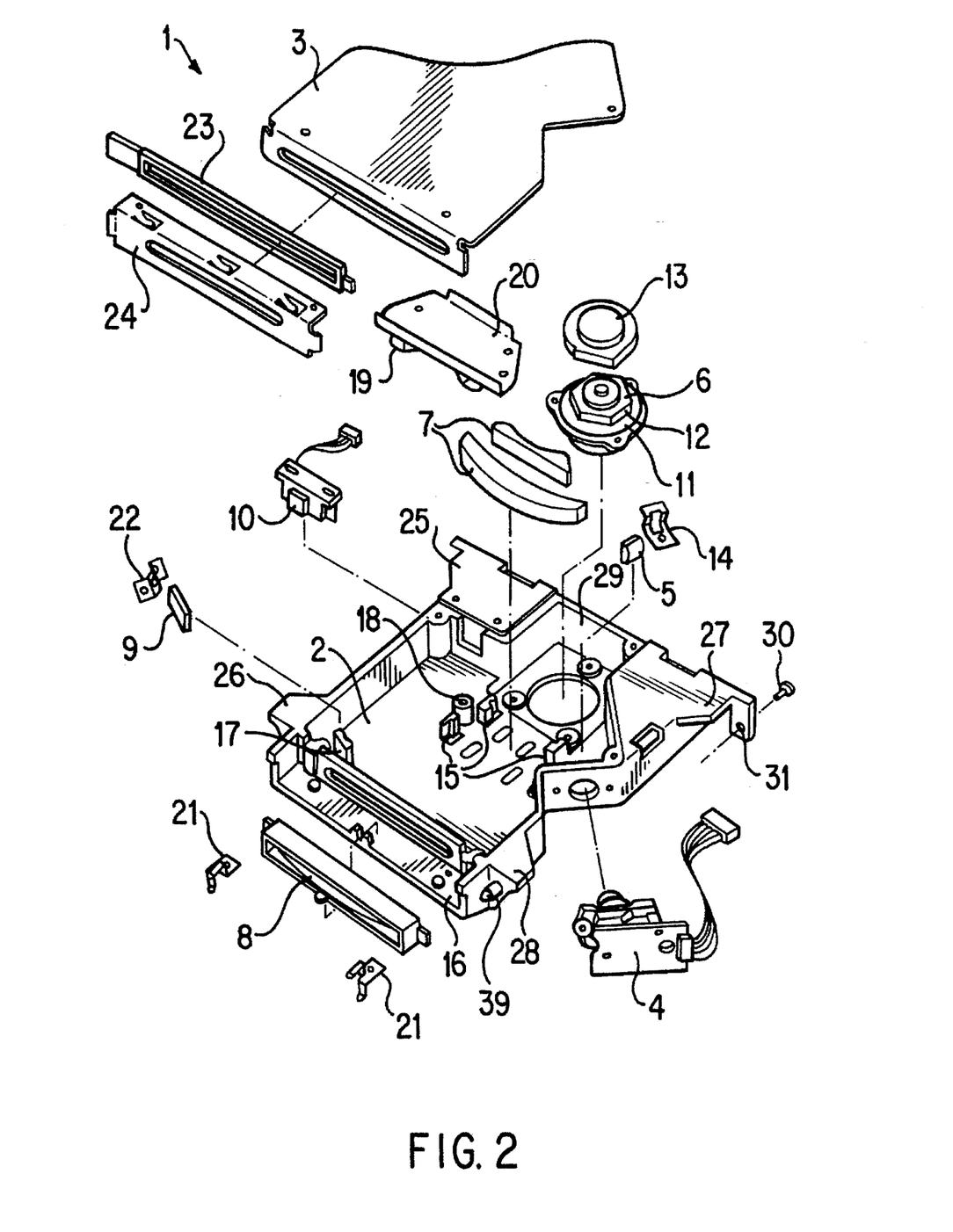
FIG. 2 is an exploded perspective view showing an element arrangement within the optical housing.

Referring now to the drawings, one embodiment of the present invention will be described. First, a structure of an optical scanning apparatus 1 will be described by referring to FIG. 2. Numeral 2 designates a flat optical housing 2 and an upper opening surface of this optical housing sealed by a cover 3. The optical housing 2 is provided with a laser source 4 including a collimator lens (not shown), a cylindrical lens 5, a deflector 6 which deflects a laser beam emitted from the laser source 4 and which passes through the cylindrical lens 5, focusing optical systems 7 and 8 which focus the laser beam deflected by the deflector 6 on a scanning surface, a mirror 9 which reflects the laser beam scanning an area outside where an image is written, and a synchronizing signal sensor 10 which is a photo-detector. The deflector 6 includes a polygon motor 11 fixed to the housing 2, a polygon mirror 12 fixed directly to the polygon motor, and a soundproof cover 13 covering the polygon mirror 12.

The cylindrical lens 5 is pressed and fixed to a positioning portion (not shown in FIG. 2) which is formed at a bottom of the optical housing 2 by a leaf spring 14. The optical housing 2 is provided with plural positioning portions 15, 16 and 17 and bosses 18. A supporting member 20 with springs 19 pressing a fθ lens which is in the focus optical system 7, is installed to the bosses 18. A troidal lens which is in the focus optical system 8 is pressed and positioned to the positioning portion 16 by leaf springs 21. The mirror 9 is pressed and positioned to the positioning portion 17 by a leaf spring 22. A holding member 24 attachably holding a dustproof plate 23 is installed to the cover 3. Extending portions 25, 26, 27 and 28 and a back surface board 29 are formed in the optical housing 2 and mounting holes 31 are formed at both sides of the back surface board 29.

Figure 1:
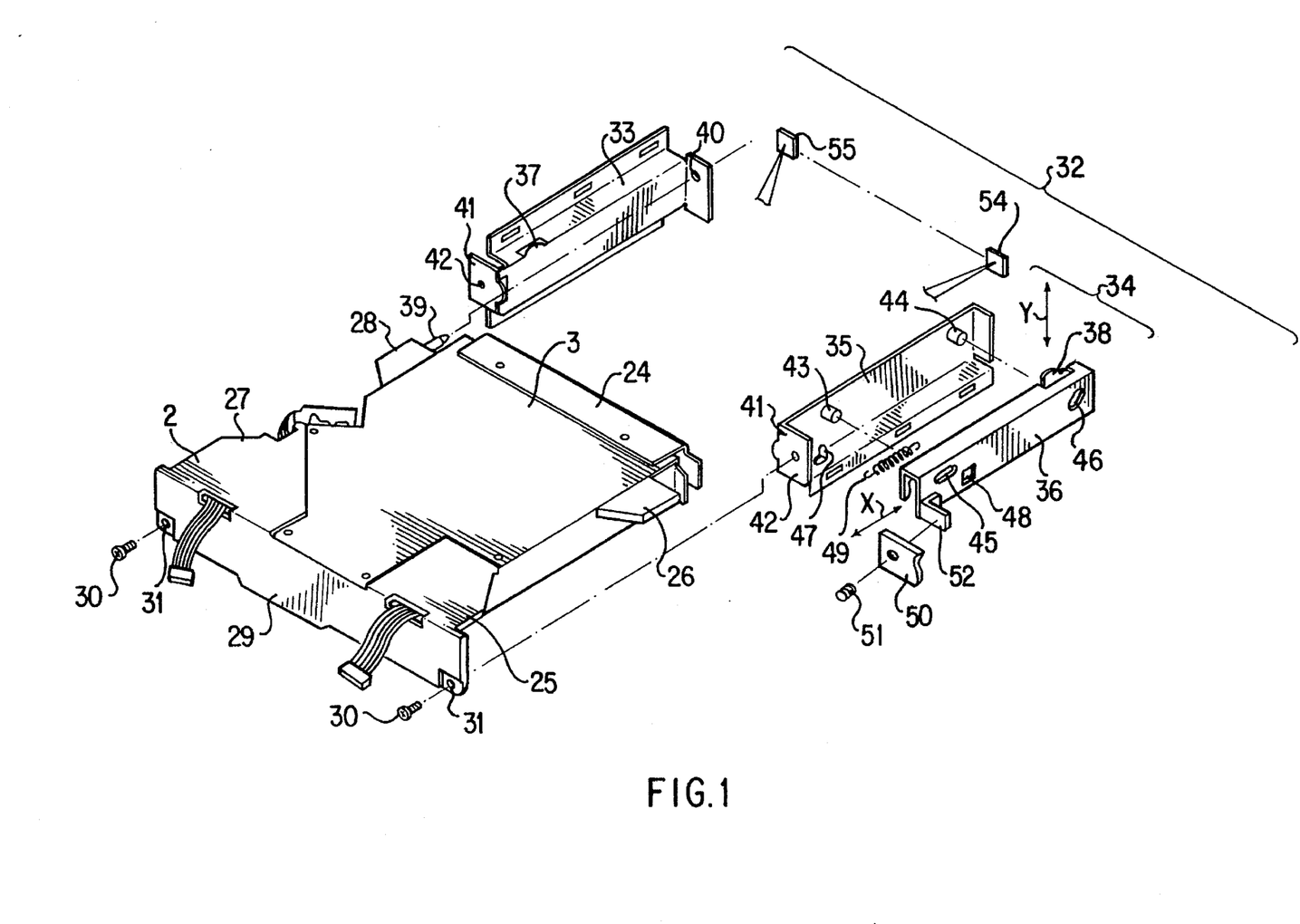
FIG. 1 is an exploded perspective view showing a relation between an optical housing and a supporting apparatus of a scanning apparatus of an embodiment of the present invention.

Next, as shown in FIG. 1, a guide device 32 guiding the optical housing 2 in an optical axis direction is installed and this guide 32 is composed of a left slide rail 33 and a right slide rail 34. One slide rail 34 includes a fixed rail 35 and a movable rail 36. A projection 37 supporting the extending portion 27 is formed on the slide rail 33 and a projection 38 supporting the extending portion 26 is formed on an upper side of the movable rail 36.

A positioning hole 40 is formed at one end of the slide rail 33 and is engaged with a positioning pin 39 formed at one end of the optical housing 2. Positioning portions 41 are formed at ends of the slide rail 33 and the fixed rail 35 and positioning portions 41 are pressed to both ends of the backsurface 29 of the optical housing 2. Screw holes 31 with which the mounting screws 30 are engaged are formed in the positioning portions 41.

Figure 3:
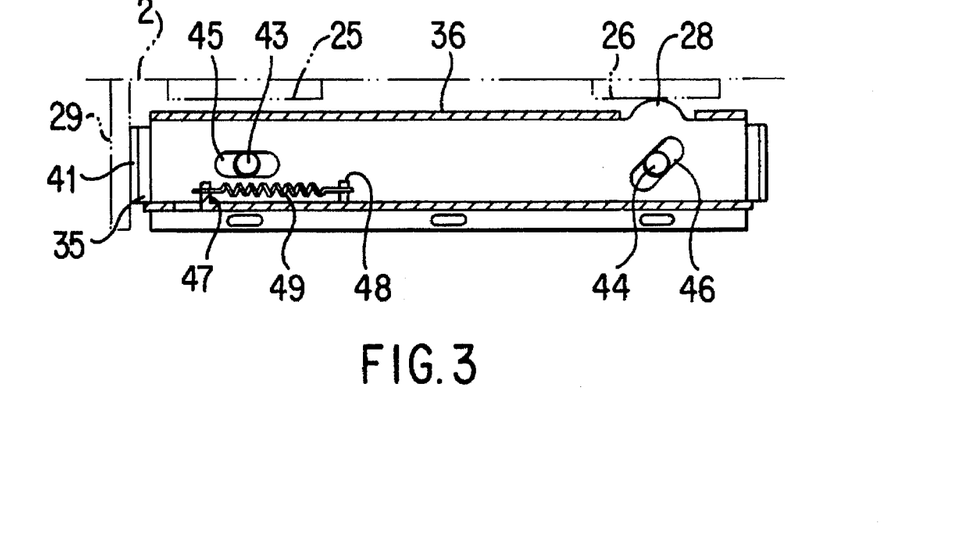
FIG. 3 is a vertical sectional side view of an adjusting device for an inclination in a sub-scanning direction.

Further, engaging pins 43 and 44 are formed in the fixed rail 35 and respective oval holes 45 and 46 which the engaging pins 43 and 44 are inserted into are formed in the movable rail 36. One oval hole 45 is formed in a horizontal direction and the other oval hole 46 is formed in a slant direction in an upper direction toward an end of the movable rail 36, as is also shown in FIG. 3.

The movable rail 36 is moved with respect to the fixed rail 35 in an optical axis direction which is shown as an arrow X direction in FIG. 1, and thereby the movable rail 36 is pivoted at the engaging pin 43 of a support in an arrow Y direction in FIG. 1. Further, a spring 49 is fixed to a projection 47 of the fixed rail 35 and to a projection 48 of the movable rail 36. A projection 52 is formed at an end of the movable rail 36 and contacts a tip of an adjusting screw 51 which is engaged with a fixed portion 50. Therefore, the movable rail 36 is forced to a side of the fixed portion 50 by the spring 49 and it is set at a determined position by the contact between the projection 52 and the adjusting screw 51. Then the projection 38 moves a free end of the optical housing 2 and thereby the optical housing 2 is pivoted at the positioning pin 39 of the support. Further, sensors 54 and 55 are arranged as facing both ends of a surface where the laser beam emits light in the optical housing 2.

Figure 4:
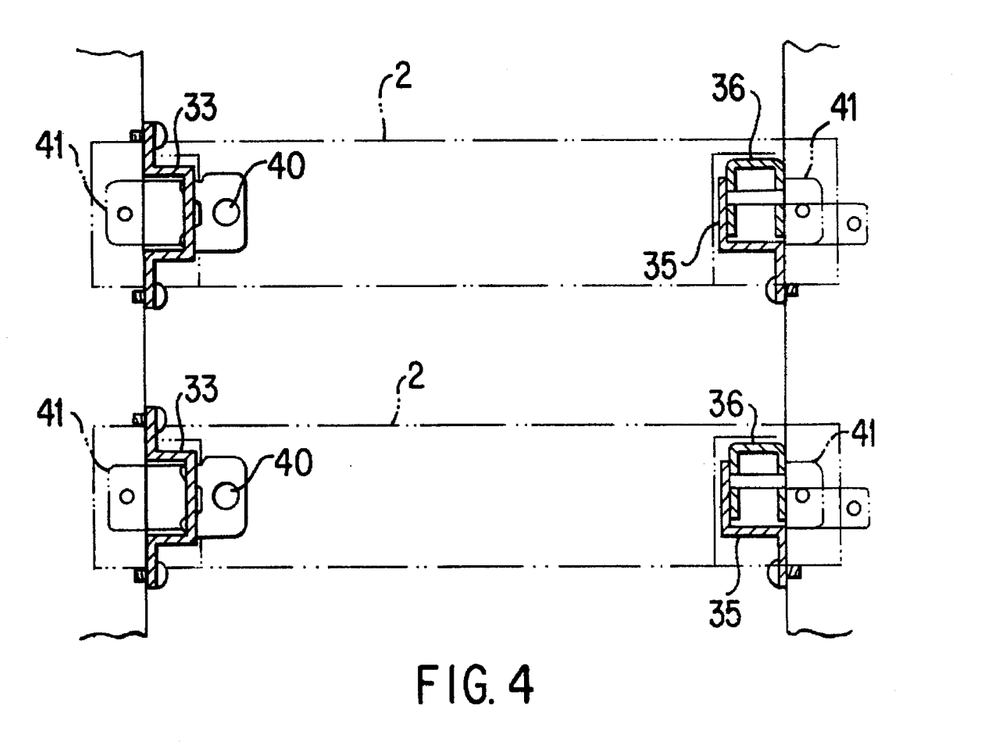
FIG. 4 is an elevation view showing a supporting structure of a slide rail.
Figure 5:
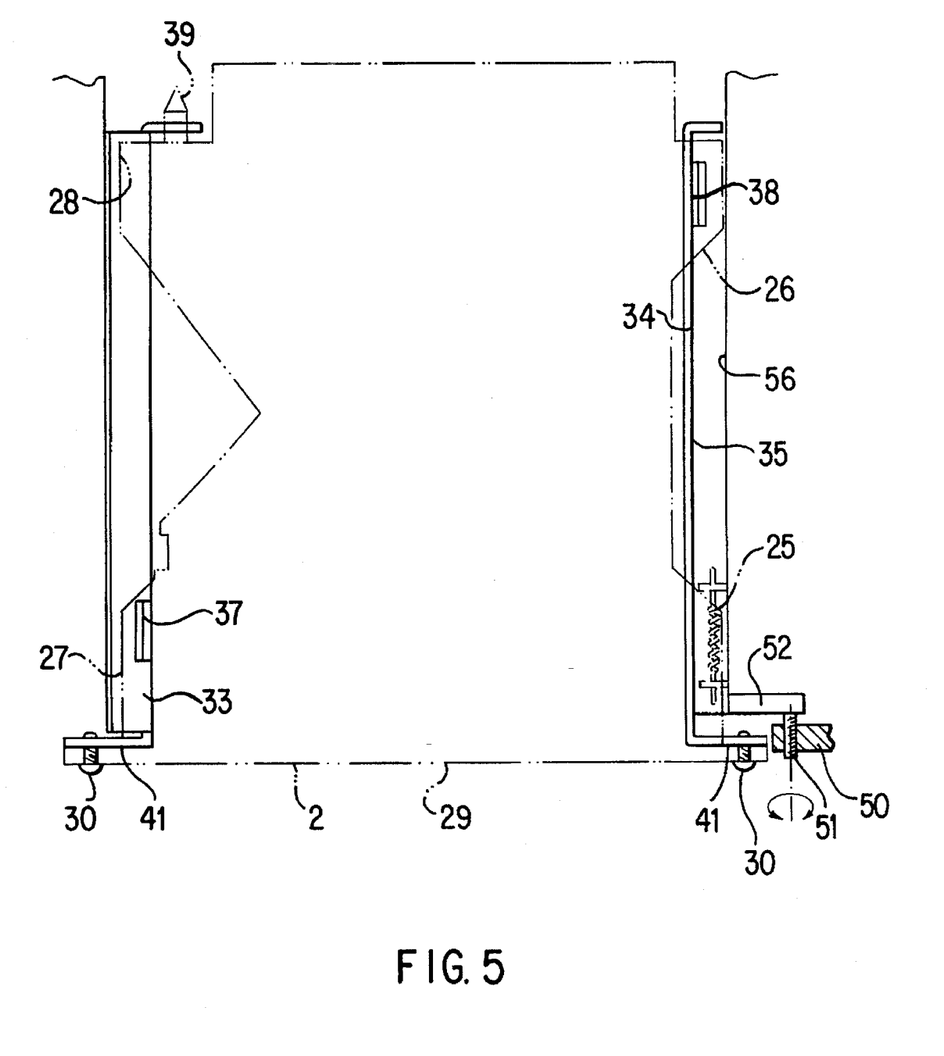
FIG. 5 is a plan view showing the supporting structure of the slide rail.
Figure 6:
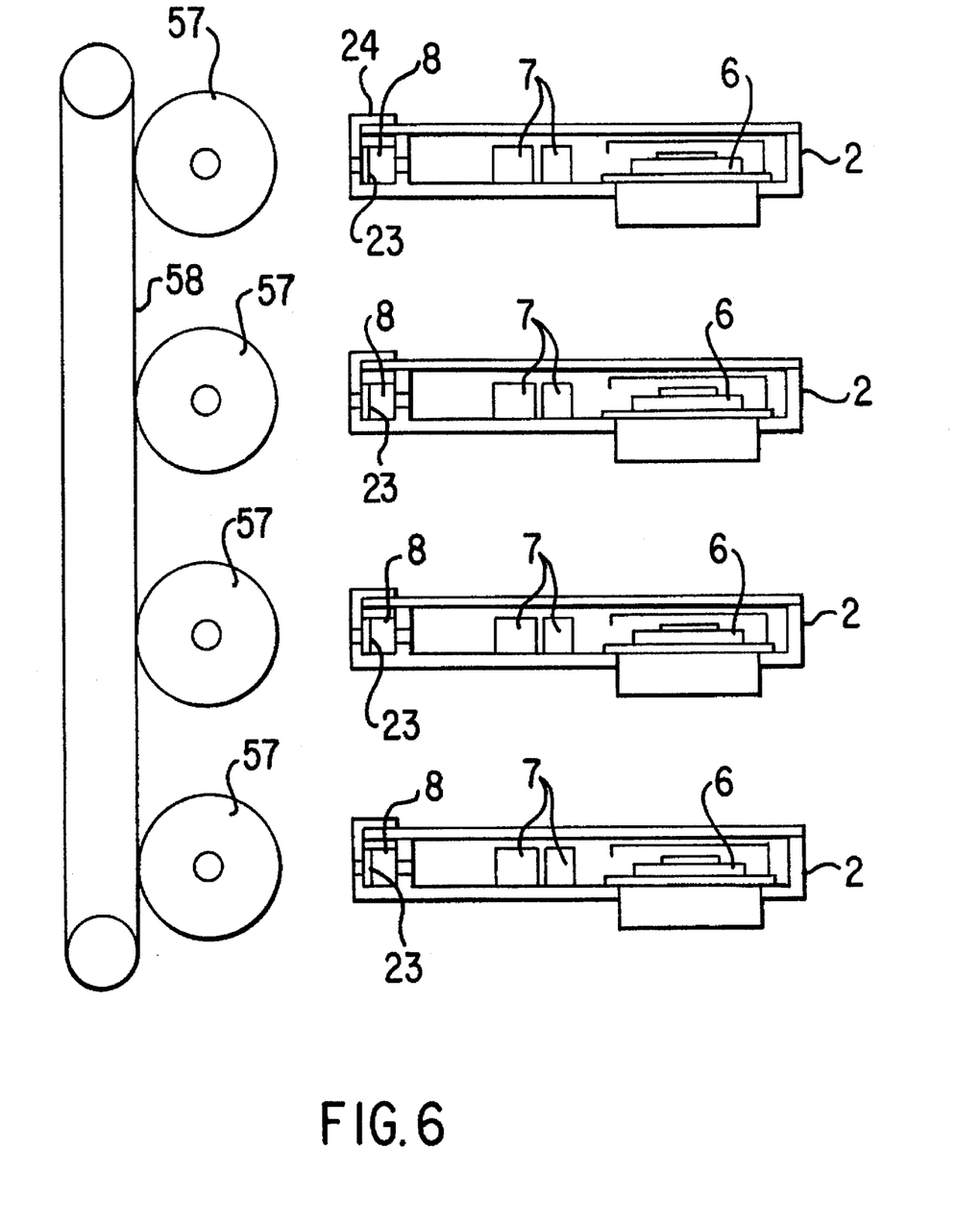
FIG. 6 is a vertical sectional side view showing optical housings arranged in image forming stations.

As shown in FIGS. 4 and 5, the slide rail 33 and the fixed rail 35 are engaged with both sides of a frame 56 in an image forming apparatus, such as a laser printer, a digital copying machine, etc., by screws. Two sets of the slide rails 33 and 34 are shown in FIG. 4, although however four (or more) sets may be actually arranged whereby four optical housings 2 are supported as shown in FIG. 6. Further, as shown in FIG. 6, a photoconductive element 57 which has a scanning surface is rotatably installed at a side where the laser beam emits light in each optical housing 2 and a transferring belt 58 contacting the photoconductive element 57 is rotatably installed. The fixed portion 50 described in FIG. 1 is formed in one portion of the frame 56.

In such a structure, the laser beam emitted from the laser source 4 is scanned by the polygon mirror 12 and is focused on the photoconductive element 57 by the optical systems 7 and 8. As a result, an electrostatic latent image is formed on the photoconductive element 57. This electrostatic latent image is developed by a developing device (not shown in the Figures) and is transferred onto the transferring belt 58. Then a transferring image on the transferring belt 58 is transferred onto a transferring sheet (not shown in the Figures).

As described above, the supporting apparatus of the present invention includes the positioning pin 39 and the positioning hole 40 which are engaged with each other, the slide device 32 which is composed of the slide rails 33 and 34 and which slidably supports the optical housing in the optical axis direction, and the positioning portions 41 which contact the both ends of the back side surface of the optical housing 2 when the optical housing 2 is inserted. Then the positioning is achieved by the support by the slide device 32, the engagement between the positioning pin 39 and the positioning hole 40, and the contact between the positioning portions 41 and the both ends of the back side surface of the optical housing 2. After that, the mounting screws 30 are engaged with the screw holes 42 of the slide rails 33 and 34 through the mounting holes 31 of the back side surface 29.

As a result, the optical housing 2 can be positioned by such an easy structure and an easy assembly work. Moreover, in the image forming apparatus having the plural image forming stations, this positioning of each optical housing 2 can also be achieved easily.

Further, as described above, the optical housing 2 is stably supported by three points which are the engagement between the positioning pin 39 and the positioning hole 40, and the contacts between the projections of the slide rails 33 and 34 and the extending portions 37 and 38. In FIG. 1, the movable rail 36 is moved toward one direction of the X direction when the adjusting screw 51 is forwarded and the movable rail 36 is moved toward the other direction of the X direction when the adjusting screw 51 is backwarded. As the oval hole 46 with which the engaging pin 44 is engaged is inclined with respect to the X direction, the movable rail 36 is pivoted at the engaging pin 43 of the support, and therefore the projection 38 is vertically moved in the Y direction. Then the projection 38 moves the free end of the optical housing 2 and thereby the optical housing 2 is pivoted at the positioning pin 39 of the support. Therefore, the inclination in the sub-scanning direction of the optical housing is adjusted.

As a result, only by the operation of the screw 51, the inclination in the sub-scanning direction of the optical housing 2 can be easily adjusted.

Figure 7:
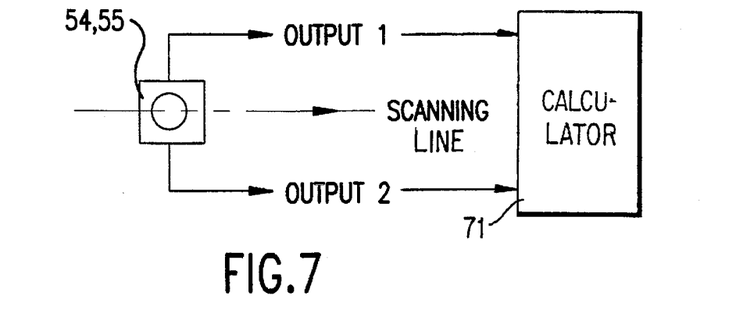
FIG. 7 is an elevation view showing a sensor.

As shown in FIG. 7, the sensor 54,55 which detects the laser beam emitted from the end of the optical housing 2 may be implemented as a sensor 54,55 having a detecting surface which is divided into two areas by a dividing line. If the laser beam is not scanned on the dividing line, a difference between an output 1 and an output 2 is generated. In the optical scanning apparatus, such a sensor 54,55 is arranged at the position facing the end of the side through which the laser beam emits light in the optical housing 2, which is a side of the free end, and an inclination ratio of the optical housing 2 is calculated in a calculator 71 by the output of this sensor 54,55. By the result of the calculation, the adjusting screw 51 may be rotated by a driver which may be a motor. Therefore, even if an image formed on the scanning surface of the photoconductive element 57 is not reproduced, the inclination of the optical housing 2 can be automatically adjusted on the basis of the output of the sensor 54,55.

Further, plural sensors 54 and 55 are arranged as facing both ends of the side through which the laser beam emits light in the optical housing 2 and the inclination of the optical housing 2 can be adjusted on the basis of the outputs of both sensors 54 and 55.

When plural optical housings 2 are arranged as corresponding to plural scanning surfaces, the guide device 32 including the positioning hole 40, the slide rails 33 and 34, and positioning portions 41, are supported by one supporting member which is the frame 56 in FIG. 5. Thereby, a relative positioning accuracy among the plural optical housings 2 in the plural image stations can be high when the plural image stations are assembled. As a result, a high quality image can be achieved.

Figure 8A:
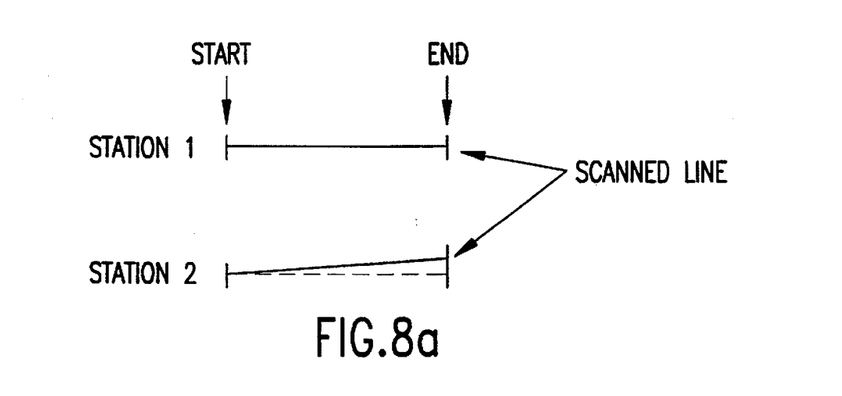
FIG. 8(a) shows scanning lines formed in each of plural image forming stations.
Figure 8B:
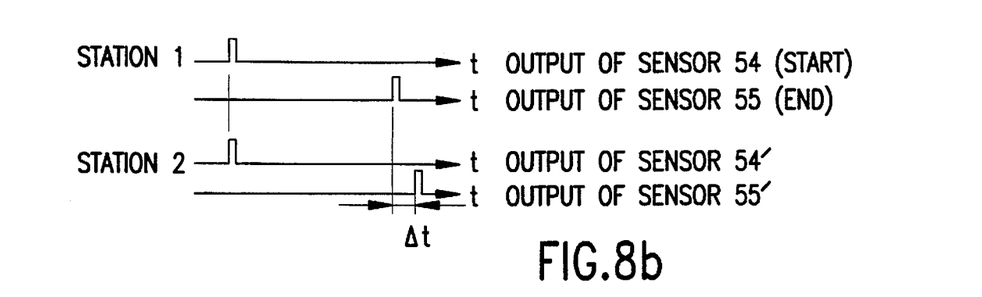
FIG. 8(b) is a timing chart showing outputs of the sensors of the plural image forming stations.

Moreover, a pair of sensors 54 and 55, which can be one detecting surface, are arranged as facing the both ends, which are a starting position and an ending position of the scanning line, of the side through which the laser beam emits light in the housing 2, and therefore a relative inclination of each optical housing 2 is adjusted on the basis of the outputs of the sensors 54 and 55. That is, when the sensors 54 and 55 are arranged as facing the both ends of the side through which the laser beam emits light in the housing 2, if a scanning line of the optical housing in the station 1 is inclined relatively to that of the optical housing in the station 2 as shown in FIG. 8(a), a time error Δt is generated regarding a time between the output of the sensor 54 of the starting position and the output of the sensor 55 of the ending position. As a result, the relative inclination among the optical housings can be recognized.

Therefore, the outputs of the sensors 54 and 55 are calculated by the calculator 71, and on the basis of the result of the calculation, the adjusting screw 51 may be rotated by a driver which may be a motor. Therefore, the inclination of the optical housing 2 can be automatically adjusted on the basis of the output of the sensors 54, 55. Further, a line sensor can be used instead of a pair of the sensors 54, 55.

Figure 9:
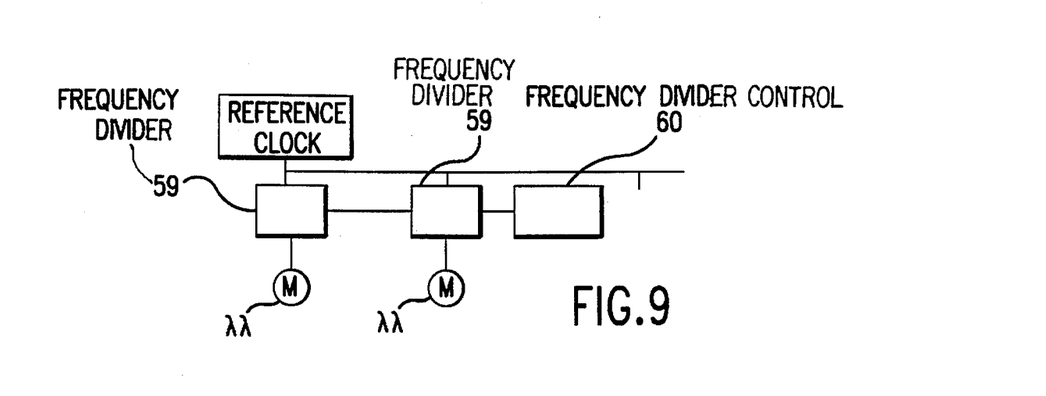
FIG. 9 is a block diagram showing a driving circuit of a polygon motor.

When the plural image forming stations are arranged, a distance difference between the optical housing 2 and the photoconductive element 57 among the stations causes a magnification difference of an image among the stations. On the other hand, as shown in FIG. 9, polygon motors 11 are driven by a pulse signal, output of frequency divider 59, which is at a divided frequency of a reference clock 91, and thereby the laser beams are scanned. As described above, if the two sensors 54, 55 are arranged respectively at the scanning starting position and the scanning ending position, a frequency dividing ratio of the polygon motor 11 of each station is selected by frequency divider control 60 as to a same time. As a result, the magnification ratio of each station can be the same, and therefore an image quality can be improved.

Obviously, numerous additional modifications and variations of the present invention are possible in light of the above teachings. It is therefore to be understood that, within the scope of the appended claims, the present invention may be practiced otherwise than as specifically described herein.

What is claimed as new and desired to be secured by letters patent of the United States is:

1. A supporting apparatus for an optical scanning apparatus, comprising:
   an optical source which emits an optical beam;
   a deflector which deflects the optical beam from the optical source;
   a focusing lens which focuses the optical beam from the deflector;
   an optical housing which is provided to house the optical source, deflector and the focusing lens;
   a positioning device which supports the optical housing and positions the optical housing relative to a frame; and
   an adjusting device which moves an end of the optical housing in a sub-scanning direction so that an inclination of the optical housing in the sub-scanning direction can be adjusted.

2. The supporting apparatus for an optical scanning apparatus according to claim 1, wherein
   the positioning device comprises:
      a slide rail device which supports the optical housing;
      a positioning pin formed in the optical housing;
      a positioning hole which is formed in the slide rail device and which is engaged with the positioning pin; and
      a positioning portion which is formed in the slide rail device and which contacts the optical housing;
   the adjusting device comprises:
      an adjusting screw;
      a movable rail in the slide rail device; and
      wherein the adjusting screw presses an end of the movable rail and another end of the movable rail presses the end of the optical housing in the sub-scanning so that the inclination of the optical housing in the sub-scanning direction can be adjusted.

3. The supporting apparatus for an optical scanning apparatus according to claim 2, wherein
   the slide rail device comprises a first slide rail which is fixed to the frame and a second slide rail which comprises a fixed rail which is fixed to the frame and a movable rail in an optical axis direction, and therein projections formed in the slide rails support the optical housing;
   the positioning pin is formed in the optical housing;
   the positioning hole which is formed in the slide rail is fixed to the frame and is engaged with the positioning pin;
   the positioning portion which is formed in the slide rails is contacted with the optical housing;
   and wherein the adjusting device further comprises:
      a first oval hole which is formed in the optical axis direction and to which a first projection formed in the fixed rail is inserted;
      a second oval hole which is formed in a slant direction with respect to the optical axis direction and to which a second projection formed in the fixed rail is inserted;
      wherein the adjusting screw presses the end of the movable rail, and the movable rail moves in the second oval direction, and the other end thereof presses the end of the optical housing in the sub-scanning direction so that the inclination of the optical housing in the sub-scanning direction can be adjusted.

4. The supporting apparatus for an optical scanning apparatus according to claim 1, further comprising:
   a sensor which detects the scanned laser beam;
   a calculating device which calculates an inclination of the optical housing in the sub-scanning direction based on an output of the sensor;
   a driving device which drives the adjusting device based on a result of the calculating device; and wherein the inclination of the optical housing in the sub-scanning direction can be adjusted automatically.

5. The supporting apparatus for an optical scanning apparatus according to claim 4, wherein the sensor has two detecting areas and the adjusting device moves the optical housing so that an output of the two detecting areas is identical.

6. The supporting apparatus for an optical scanning apparatus according to claim 4, wherein the sensor comprises plural sensing elements, and a first sensor is arranged at a scanning start position and a second sensor is arranged at a scanning ending position, and the adjusting device moves the optical housing so that a scanning time between the both sensors is a predetermined time.

7. The supporting apparatus for an optical scanning apparatus of claim 1, wherein the optical housing which is provided with the optical source, deflector and the focusing lens comprises:

plural optical housing elements;

plural positioning devices which support the plural optical housing elements and position the plural optical housing elements to one frame; and plural adjusting devices which move an each end of the plural optical housing elements in the sub-scanning direction so that each inclination of the plural optical housing elements in the sub-scanning direction can be adjusted.

8. The supporting apparatus for an optical scanning apparatus of claim 7, further comprising first and second sensors in which the first sensor is arranged at a scanning start position and in which the second sensor is arranged at a scanning ending position; and wherein each deflector of the plural optical housing elements includes a scanning speed changing device which changes a scanning speed based on a scanning time between the first and second sensors.

* * * * *